S. W. CRAMER AND W. B. HODGE.
HYGROMETER FOR REGULATING HUMIDIFYING AND HEATING SYSTEMS.
APPLICATION FILED MAR. 31, 1909.

1,329,112.

Patented Jan. 27, 1920.
5 SHEETS—SHEET 1.

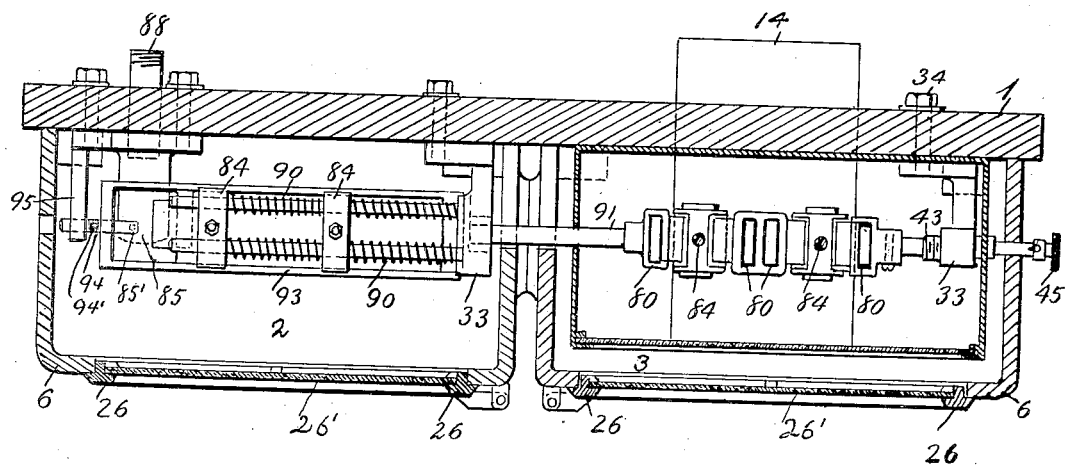

UNITED STATES PATENT OFFICE.

STUART W. CRAMER AND WILLIAM B. HODGE, OF CHARLOTTE, NORTH CAROLINA, ASSIGNORS TO PARKS-CRAMER COMPANY, OF FITCHBURG, MASSACHUSETTS, A CORPORATION OF MASSACHUSETTS.

HYGROMETER FOR REGULATING HUMIDIFYING AND HEATING SYSTEMS.

1,329,112.  Specification of Letters Patent.  Patented Jan. 27, 1920.

Application filed March 31, 1909. Serial No. 486,986.

*To all whom it may concern:*

Be it known that we, STUART W. CRAMER and WILLIAM B. HODGE, citizens of the United States, residing at Charlotte, in the county of Mecklenburg and State of North Carolina, have invented certain new and useful Improvements in Hygrometers for Regulating Humidifying and Heating Systems; and we do hereby declare the following to be a full, clear, and exact description of the invention, such as will enable others skilled in the art to which it appertains to make and use the same.

Our invention relates to automatic humidity regulators and its object is to improve the mechanical organization of apparatus operating according to the principles set forth in our prior applications Serial No. 408,049, filed December 26, 1907 and Serial No. 649,224, filed September 14, 1911, as hereinafter made more fully apparent.

In the accompanying drawings, which form part of this specification:—

Figure 1:
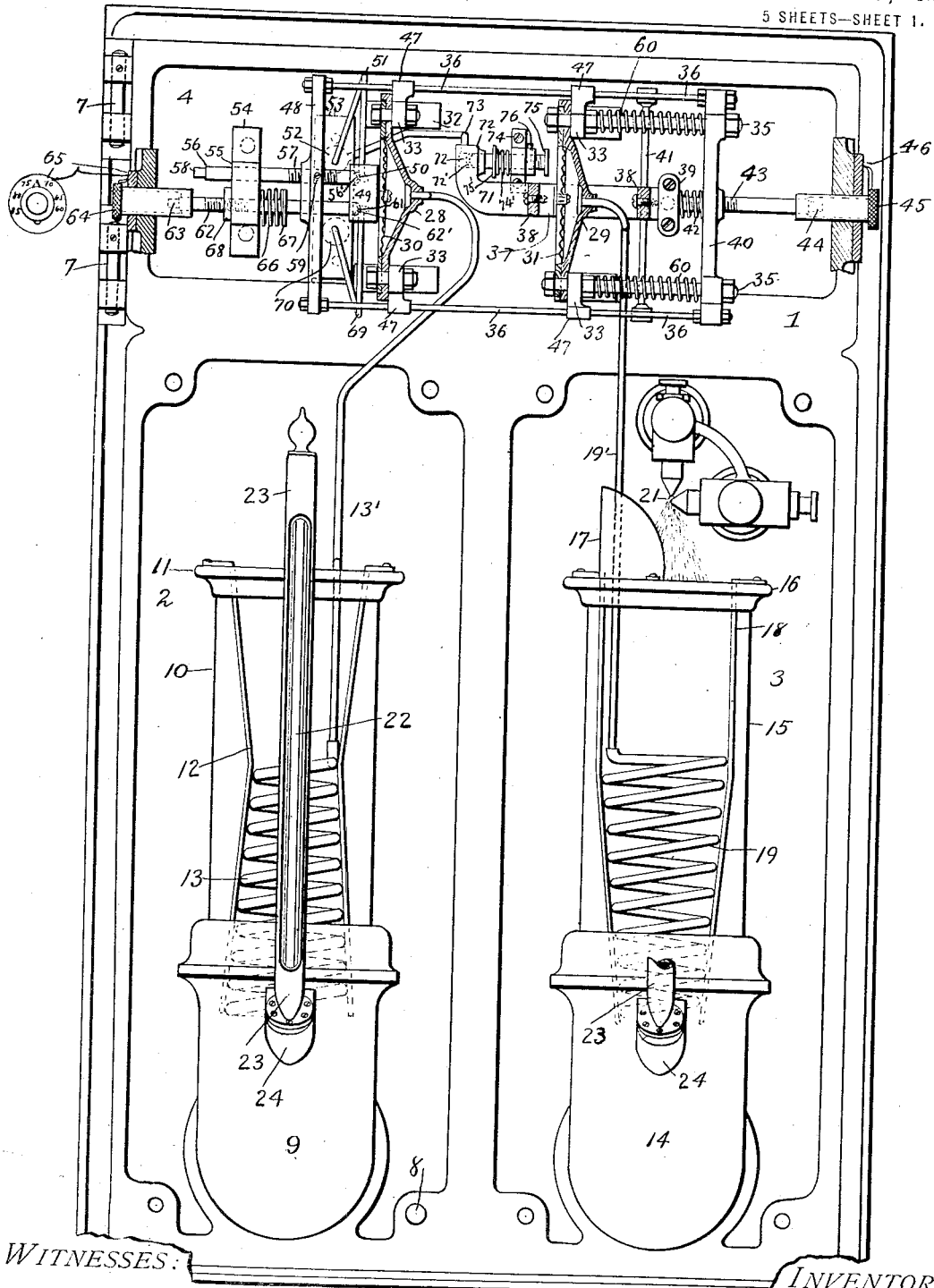
Figure 1 represents a front elevation of apparatus embodying our invention with the covers of the three compartments removed.

Reference being had to the drawings and the designating characters thereon, the numeral 1 indicates the back of the instrument to which the several parts are attached and upon which they are supported. To this back are also secured covers for the three compartments of the instrument. 2 is the dry bulb compartment, 3 the wet bulb compartment and 4 the compartment containing what may be termed the "movement" or operating mechanism. 5 is the cover to the movement compartment and 6 the cover to the wet bulb compartment, and also to the dry bulb compartment, (not shown). The movement compartment is attached to the back 1 by hinges 7, and by other fastenings on the opposite side (not shown), and the covers 6 to the wet and dry bulb compartments 2 and 3 are secured by screws, (not shown) in the holes 8, inserted from the rear of the back 1.

Figure 2:
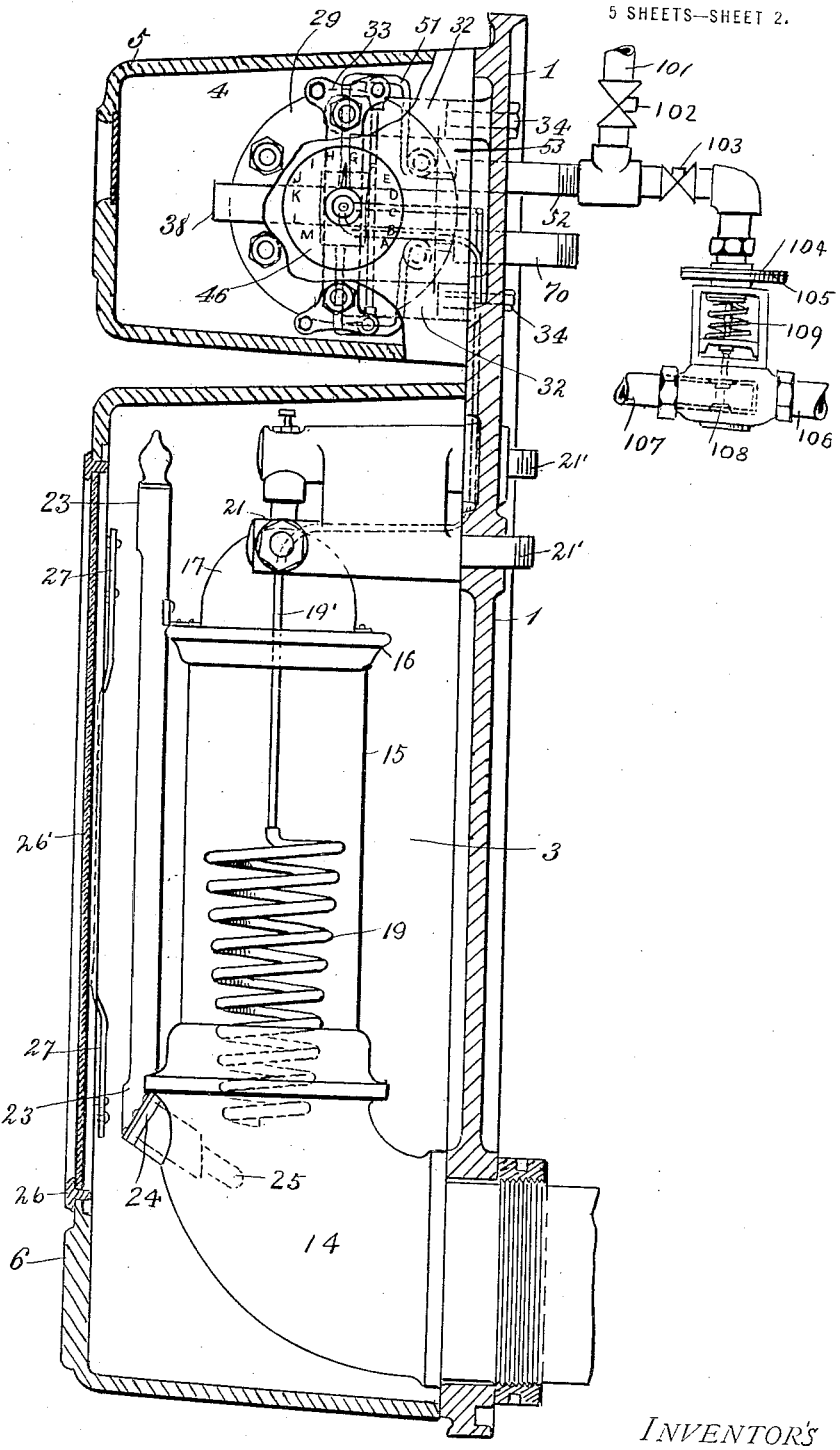
Fig. 2 represents a vertical transverse section with some of the parts in side elevation.
Figure 3:
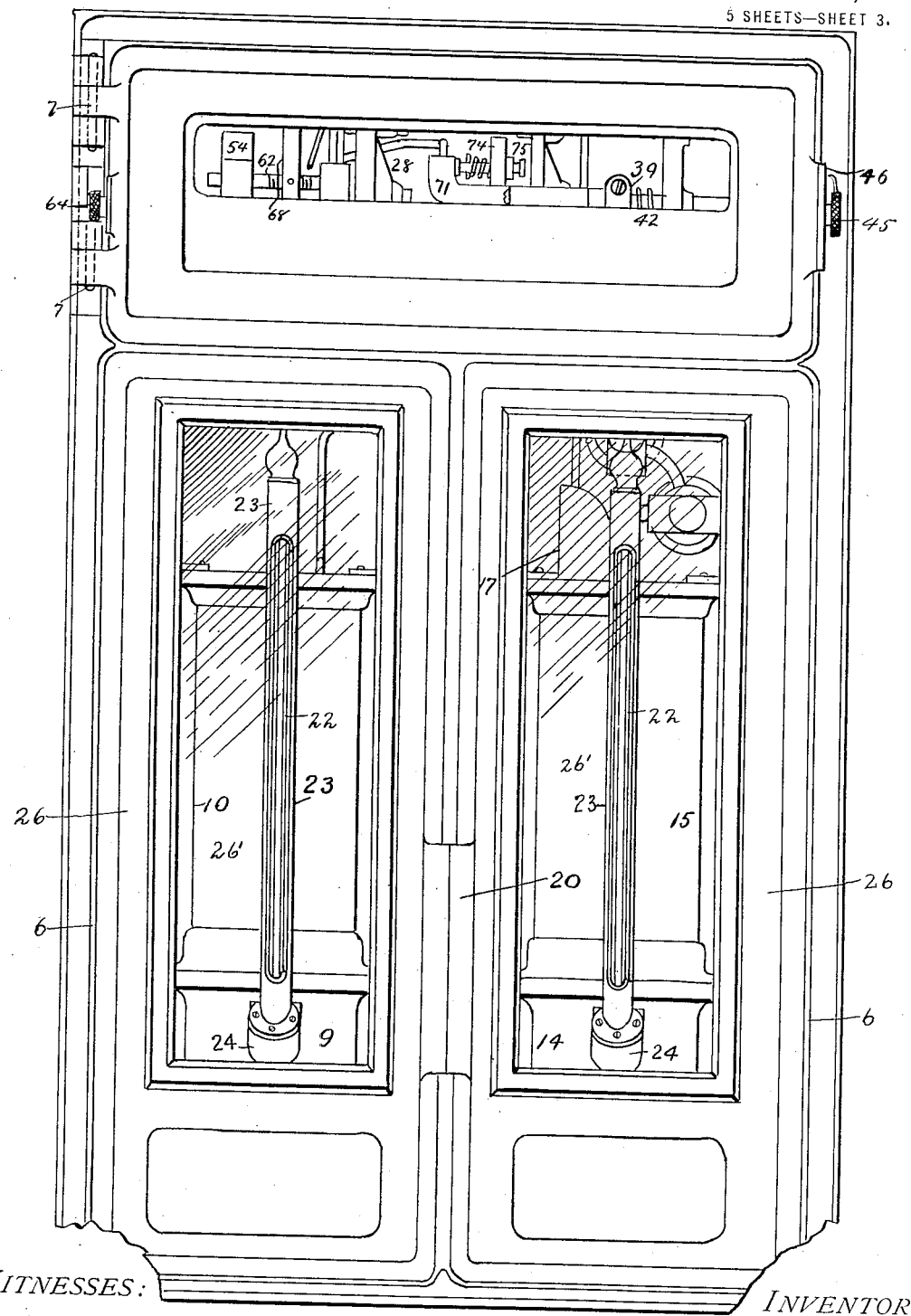
Fig. 3 shows a front elevation of the completed apparatus.

The dry bulb compartment and the wet bulb compartment are made entirely separate with but an air passage 20 shown in Fig. 3 between in order that a higher or lower temperature in the one may not exert any influence on the other. 9 represents an elbow extending through the back 1 for the purpose of admitting air to the dry bulb compartment 2; 10 is a glass cylinder supported upon and secured to the elbow 9; 11 is a ring affixed to the upper end of the glass cylinder 10, and from which is supported by suitable supports 12 the dry bulb thermometric element 13. 14 is another elbow extending through the back 1 for the egress of air and moisture from the wet bulb compartment; 15 is a glass tube supported on and secured to the elbow 14; 16 is a ring with shield 17 attached to the upper end of the glass cylinder 15, and from which ring by suitable supports 19, the wet bulb thermometric element 19 is supported. Air is drawn through the elbow 9 and the glass cylinder 10 into the dry bulb compartment 2, thence through opening 20 between the dry and wet bulb compartments, thence through the glass cylinder 15 and out through the elbow 14; this draft of air is secured by the inductive effect of the spray device 21 (supplied with water through pipes 21', 21', as shown in Fig. 2) which delivers a conical shaped mass of spray down through the glass cylinder 15; this spray device, therefore accomplishes the double purpose of creating a draft of air through the apparatus and of subjecting the wet bulb thermometric element to the temperature of evaporation, without the use of rags or other coverings. Whereas the wet and dry bulb thermometric elements 13 and 19 are the actuating elements, duplicate thermometers 22 of the glass type are inserted in the elbows in each compartment, from which temperatures may be read if desired; these thermometers are incased in metal tubes 23 supported on lugs 24 through which the bulbs 25 project into the elbows 9 and 14. 26 are doors or covers, provided with glass panels 26' and equipped with springs 27 that permit access to the wet and dry bulb compartments 2 and 3 without having to remove the covers 6.

Omitting the glass tube thermometers 22, which are not essential to the operation of the apparatus, it will be noticed that the wet and dry bulb thermometric elements consist of spiral metallic tubes 13 and 19, preferably arranged as indicated so as to expose the greatest amount of surface to the passage of air, the upper end of each of which is connected through extensions 13' and 19' respectively, to the side of diaphragm chambers 28 and 29; these elements are filled with expansible fluids, such as ether or the like which respond to changes in the temperature to which each is subjected, thereby exerting varying pressures on the diaphragms 30 and 31. The diaphragm chambers 28 and 29 are rigidly secured to the back 1 by lugs 32, the feet of which are bolted to the back 1 secured by nuts 34, the head ends of the lugs 32 carrying brackets 33, which not only serve to support the diaphragm chambers 28 and 29, but also support the connecting rods 36, and act as bearings or supports for the guide rods 35. Attached to the front of the diaphragm 31 is a bracket 37 to which is attached a stirrup 38 for the purpose of communicating the motion of the diaphragm to the ball and socket joint 39 in the rear of the diaphragm chamber. To this ball and socket joint is attached by a screw-threaded rod 43, a cross bar 40 to which the connecting rods 36 are rigidly fastened. 41 is merely a distance piece sliding freely on the connecting rods 36 and fastened securely to the stirrup 38 to prevent any rotary motion. 42 is a spring to take up the lost motion between the ball and socket joint 39 and the cross bar 40. 43 is a screw, at the end comprising the ball of the ball and socket-joint 39, terminating with a head 44 fitted to receive a key, and provided with an indicator 45 traveling on a dial 46; the purpose of this screw adjustment will be disclosed later.

The front ends of the connecting rods 36 traveling through the guides 47 carried on the brackets 33 are secured to the cross bar 48,—the four connecting rods 36 and the two cross bars 40 and 48, forming a rigid frame work for translating the motion of the diaphragm 31 to the front of the diaphragm 30, through the stirrup 38 attached to the front of the diaphragm 31. To the front of the diaphragm 30 is attached a block 49 in which is formed the valve seat 50; the chamber of the valve seat 50 is connected by flexible tubing 51 to air or fluid pipe 52 entering the rear of the back 1, the air pipe terminating in a block 53 screwed to the back 1. 54 is another block secured to the back 1, which has a hole 55 through it acting as a guide with a loose fit to the valve stem 56; the valve stem is threaded at 57 where it passes through the front cross bar 48, and the end of the valve stem is fitted with a head 58 for screw adjustment by means of a key; in the preliminary adjustment or setting, the valve stem 56 is secured to the front cross bar 48 by a set screw 59; the valve stem 56 carries on its other end a point or valve 56' ground to fit the valve seat 50 that is chambered into the block 49. It will thus be seen that as the valve stem 56 is rigidly secured to the front cross bar 48 which has the same motion as the diaphragm 31 connected with the wet bulb thermometric member, that variations in the indications of the wet bulb member alone would cause the valve seat 50 to be opened, thereby admitting or exhausting air from the air or fluid pipe 52 entering through the rear of the back 1 as shown in Figs. 1 and 2, and leading to a water supply valve, 104, which consists of an ordinary diaphragm valve with inlet 106 and outlet 107 leading to the moisture producing mechanism. The valve disk proper 108, is held tightly against its seat by means of the spring 109, the upper end of the valve stem being attached to the flexible valve diaphragm 105. 101 is the source of air supply. 102 and 103 are cocks in the respective lines so as to throttle the air supply to the pipe 52, and also to the space above the valve diaphragm 105. When the valve seat 50 in block 49 draws air from the stem 56 this provides an escape for the air supplied at the pipe 101 and also bleeds the air from above the valve diaphragm 105 while the spring 109 raises the valve disk 108, shutting off the water from the moistening system. When the room becomes too dry the difference in temperature between the two thermostatic members increases, and the valve seat 50 closes against the stem 56 preventing an escape of air at this point which then backs up above the valve diaphragm 105 and accumulating there forces the valve 108 down and admits water to the humidifying system. But it is evident that if a corresponding change simultaneously takes place in the temperature of the dry bulb element, a corresponding and equal motion will be transmitted to its diaphragm 30, so that as the valve stem 56 moves to open the valve, (caused by the changes in the wet bulb temperature), the valve seat 50 in block 49 will have a similar movement and equal in amount, following up the valve stem, so that the valve is not opened. In other words, it is obvious that an adjustment may be made according to any predetermined difference between the movements of the diaphragms actuated by changes in the wet and dry bulb members, whereby as long as the wet and dry bulb elements are affected equally, the valve will not be opened; when the change in the wet bulb is greater than that in the dry bulb, the valve will be opened; but, when the dry bulb change is greater than the wet bulb change the valve will not be opened. Compression springs 60 are for the purpose of always maintaining a uniform tension on cross-bar 40. And so, it will be seen that a relative rise of the dry bulb temperature does not cause the valve 56′ to open, although a relative rise of the wet bulb member does cause it to open; also that an equal rise of both temperatures causes no change either to close the valve or to open it, but the valve remains either open or closed as it happened to be at the time when the combined change started.

But it is not enough to be able to maintain a constant difference between the actuations of the two thermometric elements. Provision must be made whereby a greater or a lesser difference in the indications of the two elements can be made to actuate the valve as the dry bulb temperature increases or decreases,—in other words, the difference in indications of the two thermometric members must be made to actuate at a variable difference instead of at a constant difference. It is sufficient only to say that may be accomplished in several ways, the simplest of which is to vary the mass of the expansible fluid in one of the indicating thermometric members, which can be done either by providing additional spirals in its length, or by using larger tubing. Another means of accomplishing this result is to use expansible fluids in the two members having different coefficients of expansion. Also the use of different size diaphragms accomplishes the same purpose. It is not, therefore, our intention to limit ourselves to any particular means for securing this result.

So far it will be noticed that we have provided an instrument that will open and close a valve upon a predetermined relationship, whether it be based upon a constant difference in indications of the wet and dry bulb members, or upon an increasing or decreasing difference, as the dry bulb changes.

It is necessary, however, to go still further and to make provision for lowering or raising the scale; in other words, to provide a number of parallel scales, as it were. It is obvious that this may be accomplished by the screw adjustment 43 by the use of a key to turn the screw head 44, to which is attached the indicator 45 which travels on a dial 46. This dial 46 it will be noticed is graduated alphabetically, corresponding to parallel scales of variable differences above described, for it is obvious that a turn of the indicator 45 on the dial 46 corresponds to a greater or less distance between the ball and socket joint 39 attached to the stirrup 38, which is actuated by the movement of the diaphragm 31, and the cross bar 40; varying this distance obviously makes the valve stem 56 open or close the valve 56′ with more or less change in the diaphragm 30,—i. e. with more or less difference in the indications of the thermometric elements, which is another way of stating that the valve is opened by a greater or lesser predetermined scale of differences between the temperatures of the two thermometric elements, at various dry bulb temperatures.

But, it is not enough that an automatic regulator should be capable of acting as a hygrostat to control a humidifying apparatus, for the interdependence between humidity and temperature is very striking. An examination of hygrometrical and psychrometrical tables discloses the fact that changes in temperature affect changes in humidity with great rapidity. Therefore, such an instrument should provide not only for the regulation of humidity, but also for the regulation of temperature, and not only should control the humidifying system, but should control the heating system at the same time. This is accomplished by an attachment to the dry bulb diaphragm 30, in which 61 indicates a second valve chamber in the block 49 attached to the front of the diaphragm 30; a second valve stem 62 being provided with a head 63 adapted to be turned by a key, to which is attached an indicator 64 which travels on a dial 65; this valve stem 62 extends through the block 54, by which the position of the point or valve 62′ is made stationary so that changes in the position of the diaphragm 30 will open or close the valve 62′ as the case may be. If the diaphragm 30 recedes from the point or valve 62′ on the valve stem 62, the valve is opened; if, however, the diaphragm 30 advances the valve or point 62′ on the stem 62 is not only seated, but provision is made that it can be shoved forward, the compression being taken up by the spring 66, one end of which is secured to the valve stem 62 by a pin 67 and the other end of which is secured to a bushing 68 carried by block 54,—the valve stem having screw adjustment with reference to the bushing 68 directly, instead of to the block 54 as previously stated. The opening of the valve 62′ admits air from the air pipe 70 to close a valve controlling the heat supply (not shown): 69 is a flexible tubing connecting the valve chamber 61 with air pipe 70 and the valve referred to (not shown) controlling the heat supply. The heat supply valve, is of the same general construction as the water supply valve heretofore described and is operated in like manner.

Another feature of importance incorporated in the construction of this regulator is an auxiliary control of the wet bulb temperature, whereby it cannot exceed a predetermined point. Physiologists and sanitarians are agreed that the human body is more susceptible to wet bulb temperature, or temperature of evaporation, than to dry bulb temperature; and many, therefore, lay great stress upon limiting the wet bulb temperature which shall be carried in factories and workshops, in particular.

Attached to the front side of the stirrup 38 on the diaphragm 31 is an extension 71, carrying an auxiliary valve chamber 72. From which chamber 72 is a flexible tubing 73 leading to the same air pipe 52 that controls the humidifying system. 74 is a block secured by screws to the back 1, and carrying a valve stem 75 suitably mounted in a bushing with spring 74' and pin 75' similar to what are shown on the temperature or heat control valve 62' except that this valve stem does not have a screw adjustment, but is secured with the screw 76 at a definite and predetermined point, whatever that may be. It is obvious, therefore, that motions of the wet bulb diaphragm at a certain definite and predetermined point will open the valve 72' and thereby cut off the moisture from the humidifying system, while at all points below said predetermined temperature, the auxiliary valve remains closed, and any cutting off of the water supply to the humidifying system will be accomplished by the coordination of the wet and dry bulb members as previously described.

Figure 4:
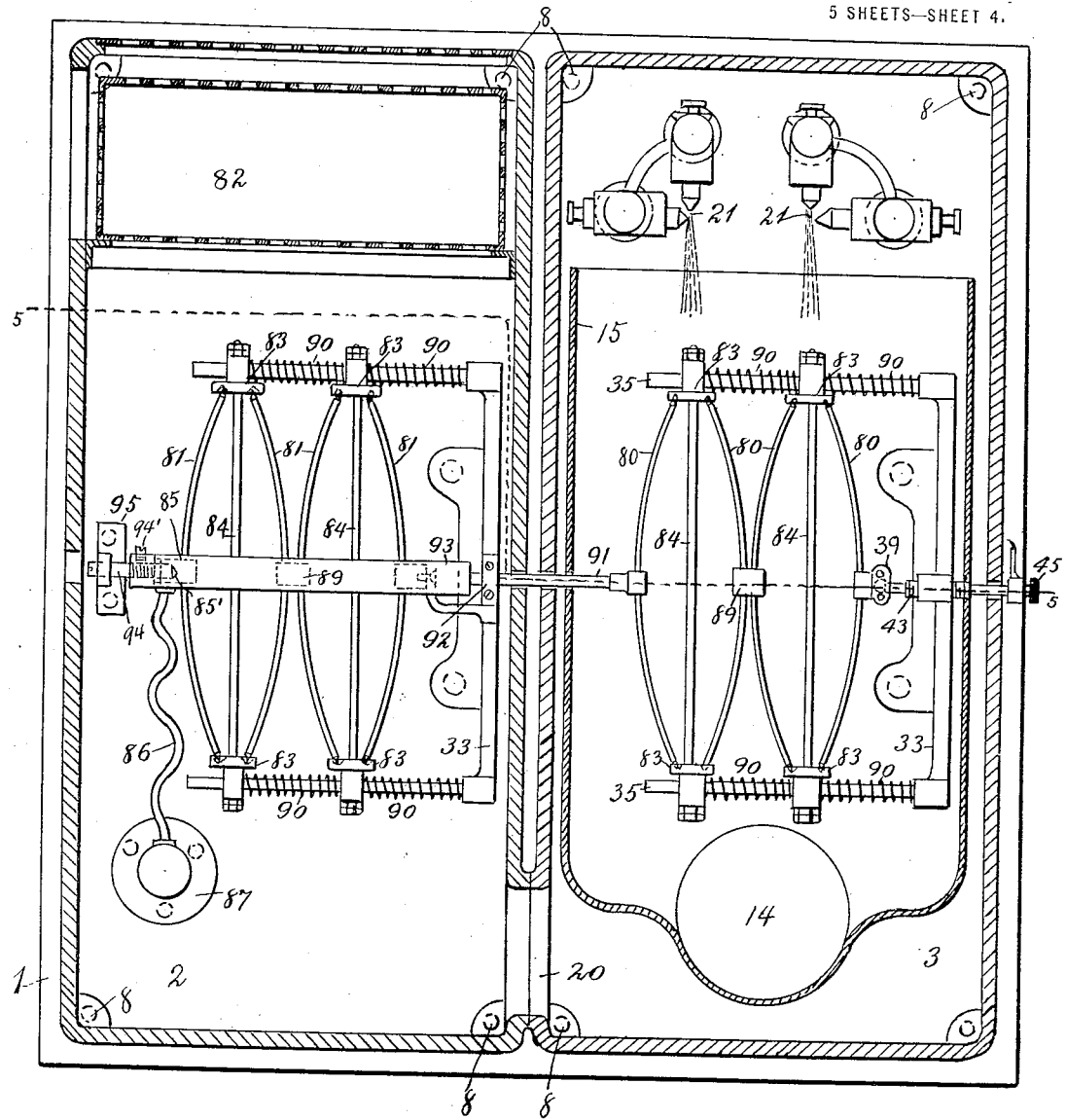
Fig. 4 represents a sectional view partly in elevation of a modification of the device, and Fig. 5 a sectional plan on line 5—5, Fig. 4.

Referring to the modifications illustrated in Figs. 4 and 5, the chief distinction between this type of instrument and the preceding type of instrument is in the combination of the expansible wet and dry members 80 and 81, which combine the functions of the dry and wet bulb spirals 13 and 19 and diaphragms 30 and 31; in other words, instead of requiring a diaphragm to utilize the expansion of the fluid in the spirals, we confine the expansible fluid in flat arc shaped tubes 80 and 81 provided with an expansible fluid. In this type of instrument the air preferably enters at the top of the dry bulb compartment through a suitable air strainer 82, and passes down over the dry members 81; the contents in these dry members expands or contracts with changes in the temperature of the air passing over them, but inasmuch as the ends are held rigidly in the blocks 83, the arcs can only bow up or flatten out, thereby moving the blocks 83 which are secured together with the tie rods 84.

It is therefore evident that the motion due to changes in temperature will be a sidewise or lateral movement, which in turn is communicated to the valve block 85 which is rigidly connected to the end member. This valve block carries a valve chamber 85' and is supplied with air or whatever is used to actuate the valves controlling the humidifying system, through the flexible spiral 86 which connects through the block 87 and out through the back of the instrument to the pipe 88 which leads to the valve shut-off mechanism (not shown). The spiral springs 90 relieve the system of lost motion.

The current of air is induced through the instrument and drawn through the opening 20 between the compartments 2 and 3 by the two spray devices 21, which maintain the members 80 in the wet bulb compartment 3 at the temperature of evaporation. These arms 80 expand and contract and thereby impart their lateral motion to the rod 91, which passes through a guide 92, and which then takes the form of a stirrup 93, passing around the dry bulb members and holding at the other end an adjustable pin 94 which is secured thereto by a set screw 94' and acts as a valve for the valve seat 85' in the support 85. As the wet bulb members expand and contract, thereby moving the valve pin 94 guided by the support 95; and as the valve seat 85' is actuated by the movement of the dry bulb members; it is evident that if the dry and wet bulb members are subject to the same change and movement corresponding thereto, the relative positions of the valve seat and the valve will remain unchanged; but if either member moves differently from the other, the valve will be opened or closed as the case may be, as heretofore described. The adjusting screw 43 working in a ball and socket joint 39 controls the position of the valve 94, and the indicator 45 attached to screw 43 shows on a graduated scale the relative position of the valve seat and the valve exactly the same as described in connection with Figs. 1 and 2.

Having thus fully described our invention, what we claim is—

1. In a humidity controlling device, a dry bulb member containing an expansible fluid and inclosed in a compartment, a wet bulb member containing an expansible fluid and inclosed in a compartment, an air passage into the dry bulb compartment, an air passage between said compartments, an air passage leading from said wet bulb compartment, and a valve operated by differences in the expansion of the fluids contained in said wet and dry bulb members.

2. In a humidity controlling device, a wet bulb member and a dry bulb member both containing expansible fluids, a dry bulb compartment inclosing said dry bulb member, a wet bulb compartment inclosing said wet bulb member, means for supplying air to said dry bulb compartment, a passage between the two compartments, an air exit for the wet bulb compartment, a third or auxiliary compartment, and mechanism in the latter compartment for opening and closing a valve by changes in the temperature to which said wet and dry bulb members are subjected.

3. In a humidity controlling device, a wet bulb member, and a dry bulb member, both containing expansible fluids, separate compartments inclosing said members, an air passage into the dry bulb compartment, an air passage between the two compartments, an air exit for the wet bulb compartment, and means for creating a draft through the two compartments.

4. A regulating device of the nature described comprising two thermostatic elements, which are separately influenced by the dry and wet bulb temperatures of the air, and a pair of coöperating pressure controlling devices operated independently by the respective thermostatic elements.

5. A regulating device of the nature described comprising a pair of coöperating pressure controlling devices, and a pair of thermostatic elements adapted to be influenced by the dry and wet bulb temperatures of the air to operate said devices independently, one of said elements being adjustable with relation to the device actuated thereby.

6. In a humidity regulator the combination of apparatus for varying relative humidity, dry and wet bulb thermal elements conjointly operating to control said apparatus and means for automatically limiting the action of said apparatus upon the attainment of a predetermined wet bulb temperature.

7. Regulating apparatus of the kind described, comprising a base, two compartments containing dry and wet bulb receptacles respectively, and a third compartment containing valve mechanism operated by the conjoint effects of the temperature changes in the compartments containing said receptacles.

8. Apparatus for regulating humidity comprising two thermal elements, one of them being subjected to the temperature of dry air and connected to operate one of the members of a pressure-controlling valve and the other element being subjected to the temperature of saturated air and connected to operate the other member of said pressure controlling valve, both valve members being thereby moved in the same direction on an increasing temperature, in combination with means controlled by said valve for varying the supply of moisture to the air of the room or space under regulation.

9. Humidity regulating apparatus comprising two thermal elements having motor diaphragms faced in the same direction each diaphragm being connected to one of the members of a device for controlling the humidity condition of the air and means for varying the mechanical relation between one of said members and the diaphragm connected thereto.

10. In humidity regulating apparatus two thermal elements respectively subjected to dry and saturated air, each connected to one of the members of a pressure-controlling valve, and each adapted to move its valve member in the same direction when subjected to an increasing temperature of the air in contact therewith.

11. In a humidity regulating device, a wet bulb member, a dry bulb member, both containing expansible fluid, separate compartments inclosing said members, an air passage through one compartment and from the same to the other compartment and a spray nozzle directed toward the wet bulb member and acting to create an air draft through both compartments.

In testimony whereof we affix our signatures, in presence of two witnesses.

STUART W. CRAMER.
WILLIAM B. HODGE.

Witnesses:
J. H. MAYES,
JNO. C. WATSON.